(12) United States Patent
Alfano et al.

(10) Patent No.: US 6,694,283 B2
(45) Date of Patent: Feb. 17, 2004

(54) EIGENVALUE QUADRIC SURFACE METHOD FOR DETERMINING WHEN TWO ELLIPSOIDS SHARE COMMON VOLUME FOR USE IN SPATIAL COLLISION DETECTION AND AVOIDANCE

(75) Inventors: Salvatore Alfano, Monument, CO (US); F. Kenneth Chan, South Riding, VA (US); Meredith Lynn Greer, Louisville, KY (US)

(73) Assignee: The Aerospace Corporation, El Segundo, CA (US)

( * ) Notice: Subject to any disclaimer, the term of this patent is extended or adjusted under 35 U.S.C. 154(b) by 31 days.

(21) Appl. No.: 10/157,432

(22) Filed: May 29, 2002

(65) Prior Publication Data

US 2003/0225546 A1 Dec. 4, 2003

(51) Int. Cl.[7] .......................... G01C 17/00; G01C 19/00
(52) U.S. Cl. ...................................................... 702/150
(58) Field of Search ................. 702/150, 127, 702/51; 342/36, 41

(56) References Cited

U.S. PATENT DOCUMENTS 5,629,707 A * 5/1997 Heuvel et al. ......... 342/357.16
5,760,737 A * 6/1998 Brenner ................. 342/357.02
6,064,942 A * 5/2000 Johnson et al. ............. 701/213
6,089,507 A * 7/2000 Parvez et al. ........... 244/158 R
6,462,697 B1 * 10/2002 Klamer et al. ................ 342/36
2002/0109628 A1 * 8/2002 Diesel ................... 342/357.14
2002/0169578 A1 * 11/2002 Yang ........................... 702/152
2003/0117317 A1 * 6/2003 Vanderwerf et al. ... 342/357.02

* cited by examiner

Primary Examiner—John Barlow
Assistant Examiner—Demetrius Pretlow
(74) Attorney, Agent, or Firm—Derrick Michael Reid

(57) ABSTRACT

A computationally efficient analytical method determines when two quadric surfaces, such as ellipsoids surfaces, share the same volume by adding an extra dimension to the solution space for providing extradimensional product matrices defining degenerate quadric surfaces. The method then examines computed eigenvalues associated the product matrices to determine when the two quadric surfaces share the same volume or when surface projected areas based on viewing angle share the same area. The method provides direct share volume results based on comparisons of the eigenvalues that can be rapidly computed. The method can be use for collision avoidance detection where the objects are modeled by quadric surfaces.

16 Claims, 2 Drawing Sheets

COLLISION DETECTION PROCESS

ROOT ADMISSIBLE EIGENVALUES REPRESENTATIVE LOCUS

ONE DIMENSIONAL OCCUPANCY

COLLISION DETECTION PROCESS

EIGENVALUE QUADRIC SURFACE METHOD FOR DETERMINING WHEN TWO ELLIPSOIDS SHARE COMMON VOLUME FOR USE IN SPATIAL COLLISION DETECTION AND AVOIDANCE

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of collision avoidance. More particularly, the present invention relates to the use of eigenvalues associated with intersecting degenerate quadric surfaces for preferred use in collision prediction, warning and avoidance methods.

BACKGROUND OF THE INVENTION

As the US Satellite Catalog transitions from general perturbations to special perturbations, the positional accuracy of each object will be readily available in the form of a covariance matrix, as well as providing position data for specifying object position vectors relative to past, present and future time. These covariances and position data can be propagated forward in time to predict a probability of collision between objects, or a probability of radio frequency interference caused by objects traversing a transmission channel path, or the probability of over flying an object subject to incidental laser illumination by another laser beam source object. Because the probability calculations can be computationally burdensome, it is desirable to prescreen candidate objects based on user-defined thresholds. Specifically, the future state of each object can be represented by a covariance-based ellipsoid and then processed to determine when the objects share a point in space that is in common during spatial coincidence. Primary and second ellipsoids and respective projections that do not touch or overlap each other can be eliminated from further processing. To date, all ellipsoidal prescreening methods involve numerical searches. For computational efficiency, such prescreening often models object as virtual spheres or virtual keep-out boxes that have much larger volumes than the respective objects but allow for quick distance comparisons. One disadvantage of the keep-out screening method is that large volumes can sound many false warnings. The virtual keep-out boxes may be found to be in projected spatial coincidence, yet the respective object will flyby with safe separation flyby distances. Hence, the keep-out screening method unnecessarily processes many objects as collision candidates for further and unnecessary processing, when there is no prospective collision potential. When considering the thousands of space objects currently catalogued, these screening methods result in increased unnecessary downstream computational processing that increases operator workload to further analyze potential satellite conjunctions in order to take evasive action when deemed necessary. The screening method would, for example, unnecessarily close a launch window when there is an insignificantly low probability of collision.

The traditional screening approaches to intersection determination have been based on a constrained numerical optimization formulation in which a requisite combined rotational, translational, and dimensional transformation reduces the secondary ellipsoid to a sphere, and then numerically searches the surface of the primary ellipsoid to obtain the point on the primary ellipsoid closest to the center of the sphere. Intersection is then determined according to whether this shortest distance exceeds the radius of the sphere.

The screening methods use direct substitution and voluminous algebraic simplification that is disadvantageously laborious and cumbersome to derive formulation for rapid determination of spatial coincidence. The general problem of analytically determining the intersection of any pair of surfaces has been performed for simple objects such as lines, spheres, and planes, but has disadvantageously not been applied to determining spatial coincidence of ellipsoids.

The formulation of conics and quadrics has been described for modeling the surface of two-dimensional and three-dimensional objects respectively. For example, two dimensional degenerate conics have been used to compute the common points shared by two ellipses using an extradimensional matrix. However, this two dimensional degenerate conics formulation is so computationally complex that it is impracticable for real time determination of the projected collisions and is only applied for two dimensional objects. These and other disadvantages are solved or reduced using the invention.

SUMMARY OF THE INVENTION

An object of the invention is to provide a method for determining when two volumes share the same space.

Another object of the invention is to provide a method for computing eigenvalues associated with potentially intersecting surfaces, and comparing the eigenvalues for determining when the surfaces intersect.

Yet another object of the invention is to provide a method for computing eigenvalues associated with potentially intersecting surfaces for an extradimensional product matrix, and comparing the eigenvalues for determining when the surfaces intersect.

Yet a further object of the invention is to provide a method for computing eigenvalues of an extradimensional product matrix associated with intersecting quadric surfaces of objects for determining when the object share common volume.

Still another object of the invention is to provide a method for computing eigenvalues of an extradimensional product matrix associated with quadric surfaces for determining when projected areas of the surfaces share common area.

The invention is directed to an analytical method for determining when two surfaces have common spatial points for indicating intersection. For example, the analytical method can be used for determining when two ellipsoids share the same volume. The method involves adding an extra dimension to the solution space for providing an extradimensional product matrix and examining eigenvalues that are associated with degenerate quadric surfaces, and then comparing the eigenvalues. A subset of the computed eigenvalues that are associated with intersecting degenerate quadric surfaces are computed and compared. The method can also be used to determine when two ellipses appear to share the same projected area based on a viewing angle. The method applies to all quadric surfaces particularly including ellipsoids. The method expands two-dimensional degenerate conics by examining the associated eigenvalue behavior for predicting shared volumes, area and points. The mathematical formulation of the conditions for intersection of the two surfaces are described by quadric forms.

In the preferred form, the method takes the 3×3 covariance matrix of a primary ellipsoid object, and places the 3×3 covariance matrix in the top three rows and columns of a primary extended extradimensional 4×4 matrix. The other seven elements are set to zero, except the last fourth-row fourth-column element, which is set to −1. The covariance matrix of the secondary ellipsoid object is firstly inverted and then extended into a secondary extended extradimensional 4×4 matrix. The remaining elements are set to represent the relative position between the primary and secondary object in quadric form. These two new extended extradimensional matrices are then multiplied, and the eigenvalues are computed, and the computed eigenvalues are examined to determine when the primary and secondary ellipsoids share the same volume. When the ellipsoids share the same volume in projected time in spatial coincidence, appropriate action can be taken to avoid collision. Of special interest is the application to the case of two positional error ellipsoids in the three dimensional space associated with the pairwise close encounters arising from thousands of space orbiting objects listed in the satellite catalog. These error ellipsoids are obtained from the covariance matrices associated with these tracked objects. The determination of intersection can be rapidly used in projected collision predictions in order to eliminate cases which that not require further detailed analysis.

The method is based on formulating the intersecting problem in four dimensions and then determining the eigenvalues of the associated degenerate quadric surface. By using abstract symbolism and invariant properties of the extended (n+1) by (n+1) matrix, the analysis is greatly simplified and the overall structure made comprehensive. The method relies on numerical observations of the eigenvalues to arrive at the conclusion whether these ellipsoids intersect. The method may also be extended in two ways. The first way, the method can be extended as valid for quadric surfaces in general including ellipsoids, elliptic paraboloids, hyperbolic paraboloids, hyperboloids of one or two surfaces, elliptic cylinders and double cones. The method can be extended to n dimensions in which the intersection determination of nth-dric surfaces is described by quadric forms in n dimensions. The method provides direct computed eigenvalue results without approximation, iteration, or any form of numerical search. The method is computationally efficient in that no dimensional distortions, coordinate rotations, transformations, or eigenvector computations are needed. The method provides direct share volume results based on comparisons of the eigenvalues that can be rapidly computed without dimensional distortions, coordinate rotations, transformations, or eigenvector computations.

The method is computationally efficient with no scaling, rotating, or transformations. The invention can be applied to satellite collision prediction and avoidance, radio frequency impingement analysis and mitigation, incidental laser illumination determination and shutter control, air traffic control, computer graphics, robotics, and cloud penetration modeling. For example, computer graphics users, such screening could be used to invoke a hidden line removal algorithm. In these applications, geometric objects need to be modeled for determining when object surfaces collide, intersect or obscure each other. These and other advantages will become more apparent from the following detailed description of the preferred embodiment.

DETAILED DESCRIPTION OF THE PREFERRED EMBODIMENT

Figure 1:
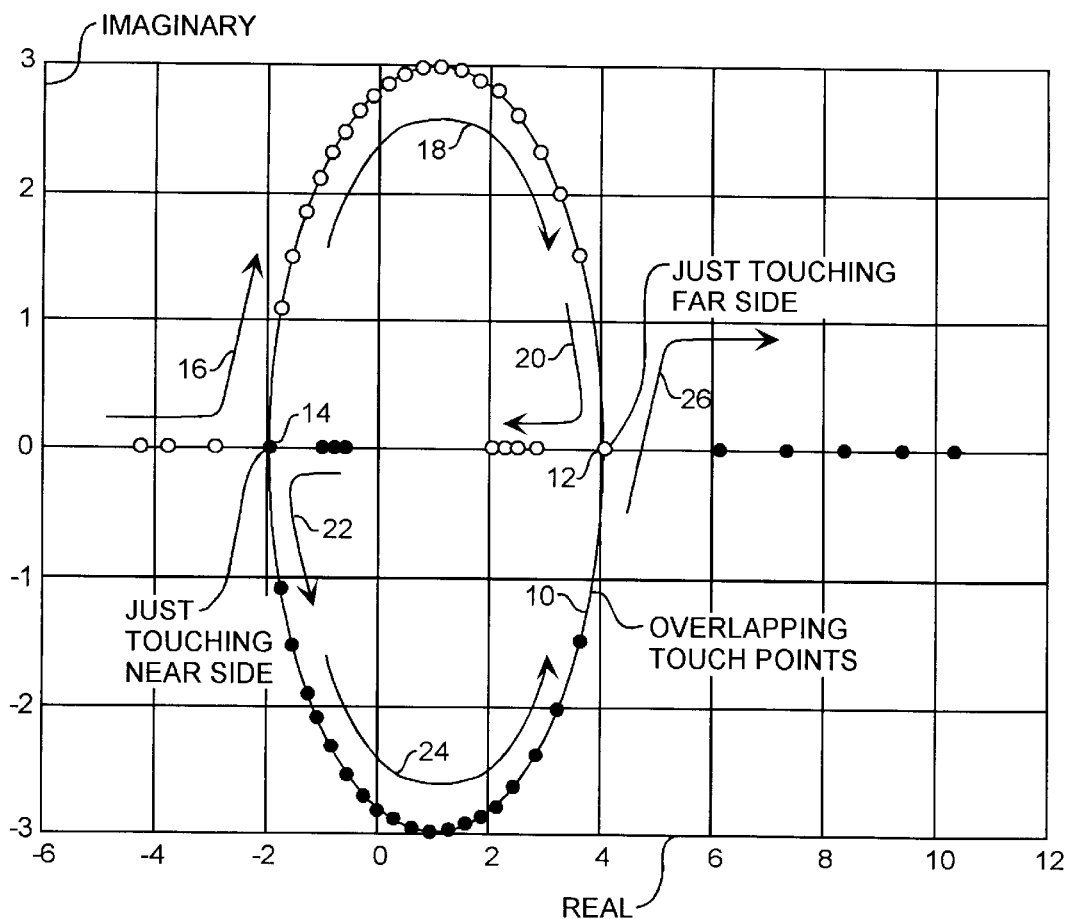
FIG. 1 is a graph of a root admissible eigenvalues representative locus.

An embodiment of the invention is described with reference to the figures using reference designations as shown in the figures after a discussion of the mathematical formulation. Ellipsoidal formulations provides various representational forms for an ellipsoid. Algebraically, the ellipsoid representation is $C_A x^2 + C_B y^2 + C_C z^2 + C_D xy + C_E yz + C_F xz + C_G x + C_H y + C_J z + C_K = 0$, where $C_A$, $C_B$, $C_C$, $C_D$, $C_E$, $C_F$, $C_G$, $C_H$, $C_J$, and $C_K$ are constants. In matrix form, the same ellipsoid can be written as $X \cdot S \cdot X^T = 0$ where $X = [x\ y\ z\ 1]$, and S is a matrix defined by an S matrix equation.

$$S = \frac{1}{2} \cdot \begin{pmatrix} 2C_A & C_D & C_F & C_G \\ C_D & 2C_B & C_E & C_H \\ C_F & C_E & 2C_C & C_J \\ C_G & C_H & C_J & 2C_K \end{pmatrix}$$

With respect to a coordinate frame, an ellipsoid can be centered at X0, Y0 and Z0. The translation of the center of an ellipsoid from the origin to [X0, Y0, Z0] can be accomplished using a T transformation matrix equation commonly used in graphics systems:

$$T = \begin{pmatrix} 1 & 0 & 0 & 0 \\ 0 & 1 & 0 & 0 \\ 0 & 0 & 1 & 0 \\ -X0 & -Y0 & -Z0 & 1 \end{pmatrix}$$

The $X \cdot S \cdot X^T = 0$ equation defines the ellipsoid so that the center is at [0, 0, 0]. An $X \cdot T \cdot S \cdot T^T \cdot X^T = 0$ equation transforms the ellipsoid so that the center of the ellipsoid is at [X0, Y0, Z0]. Similarly, all points contained within the ellipsoid satisfy the constraint $X \cdot T \cdot S \cdot T^T \cdot X^T \leq 0$. Given a 3×3 covariance matrix centered about [X0, Y0, Z0], the quadric representation of the ellipsoid would then be defined by an inverted covariance matrix equation.

$$X \cdot T \cdot \begin{pmatrix} Ci_{11} & Ci_{12} & Ci_{13} & 0 \\ Ci_{21} & Ci_{22} & Ci_{23} & 0 \\ Ci_{31} & Ci_{32} & Ci_{33} & 0 \\ 0 & 0 & 0 & -1 \end{pmatrix} \cdot T^T \cdot X^T = 0$$

In the inverted covariance matrix equation, the terms $C_i$ are the elements of the inverted covariance matrix. The ellipsoidal solution is generated with the primary object centered at an origin. An ellipsoid that corresponds to a positional covariance matrix can be computed from the inverted covariance matrix equation, resulting in an $X \cdot A \cdot X^T = 0$ equation where $A = T \cdot S \cdot T^T$. The term A is a primary object covariance matrix that is characteristic matrix of the primary object. In the same manner, a secondary object having a center that is not colocated with the center of the primary object, is an ellipsoid that can be translated relative to the primary object such that $X \cdot B \cdot X^T = 0$. The term B is a secondary object covariance matrix that is a characteristic matrix of the secondary object. When any point x exists such that X satisfies the $X \cdot A \cdot X^T = 0$ and $X \cdot B \cdot X^T = 0$ equations, then the primary and secondary ellipsoids intersect at that point. When some value of the point X satisfies the constraint for both objects as represented by the $X \cdot A \cdot X^T \leq 0$ and $X \cdot B \cdot X^T \leq 0$ equations, then that point X lies inside both ellipsoids. The $X \cdot A \cdot X^T = 0$ equation can be multiplied by a scalar constant $\lambda$ with no loss in generality and then brought inside the equation, such that, $\lambda \cdot X \cdot A \cdot X = 0$ and $X \cdot (\lambda \cdot A) \cdot X^T = 0$. Assuming a subset of X satisfies both of the $X \cdot A \cdot X^T = 0$ and $X \cdot B \cdot X^T = 0$ equations, then subset of X must also satisfy any linear combination of the two $X \cdot A \cdot X^T = 0$ and $X \cdot B \cdot X^T = 0$ equations. Such a combination is shown by subtracting the $X \cdot B \cdot X^T = 0$ and $X \cdot (\lambda \cdot A) \cdot X^T = 0$ equations to produce an $X \cdot (\lambda \cdot A - B) \cdot X = 0$ equation. The term $\lambda$ is chosen so that the parenthetical term $(\lambda \cdot A - B)$ is degenerate, which occurs when the parenthetical term $(\lambda \cdot A - B)$ determinant is zero. Because A is the characteristic matrix of an ellipsoid, A is invertible and A can be used to alter the $X \cdot (\lambda \cdot A - B) \cdot X = 0$ equation to produce an $X \cdot A \cdot (\lambda I - A^{-1} \cdot B) \cdot X^T = 0$ equation. This $X \cdot A \cdot (\lambda I - A^{-1} \cdot B) \cdot X^T = 0$ representation is more readily recognized as an eigenvalue formulation used in many mathematical software packages, where $\lambda$ is an eigenvalue and is a scalar constant. The term I is an identity matrix for multiplying the scalar constant $\lambda$ in matrix form.

Substituting selected eigenvalues into $X \cdot (\lambda \cdot A - B) \cdot X = 0$ equation will produce quadric matrices in quadric form that represent degenerate quadric surfaces. When the X subset of values satisfies the A and B covariance matrices, the primary and secondary surfaces will then pass through the points shared by the primary and secondary ellipsoids as common points on both surfaces. When the ellipsoids just touch, that is, share a single point in common, then the solution vector must also be an eigenvector of $A^{-1} \cdot B$. The converse is not true as not all eigenvectors of $A^{-1} \cdot B$ will satisfy the ellipsoidal constraints of the $X \cdot A \cdot X^T = 0$ and $X \cdot B \cdot X^T = 0$ equations.

An eigenvector has four components, [x y z E], where E is the last component. The eigenvector is deemed inadmissible when E is zero, and otherwise admissible. An eigenvalue can be either real or complex. An eigenvalue is deemed admissible when an associated eigenvector is admissible. Eigenvectors with a zero in the last component are considered inadmissible because the formulation uses a four-dimensional space with the last dimension fixed to one as shown in the X=[x y z 1] equation. That is, the eigenvector can then be scaled to one to fit the X=[x y z 1] equation when the last component is not zero. An admissible eigenvector can be tested by simply scaling the eigenvector to produce a one in the last component and then determining when the scaling meets the ellipsoidal conditions as represented by matrices A and B. When a last component of the eigenvector is not zero, then the eigenvalue is admissible and can be scaled. When the primary and secondary ellipsoids overlap, then a family of solutions describes the intersection. For such cases, two of the eigenvalues become complex. However, when the ellipsoids just touch, then the eigenvalues become real. Hence, the mathematical formation provides eigenvalues that indicate touching and intersection spatial coincidence.

Referring to FIG. 1, observed eigenvalue behavior can be recognized by a representative locus of root admissible eigenvalues. To gain an understanding of the eigenvalues when the ellipsoids do not just touch, the locus of values can be plotted for various cases by altering size, shape, orientation, and location. FIG. 1 shows representative eigenvalues defined by the representative locus 10. The two objects just touch on the near side at point 14 and just touch on the far side at point 12. The eigenvalues of the primary object moves along possible points 16 including point 14, through points 18, and then through points 20 including point 12, and the eigenvalues of the secondary object move through points 22 including point 14, through points 24, and through points 26 including point 12. At the near side just touching point 14, the two eigenvalues are negative real identical values. At the far side just touching point 12, the two eigenvalues are positive real identical values.

Hence, the touching points 14 and 12 have eigenvalues that are real and identical, where as when the ellipsoid intersect but do not touch at a single point, such as points, 12 and 14, the eigenvalues are complex conjugates. Hence, the eigenvalues can be used for indicating the extent of intersection of the ellipsoids. The two ellipsoids are initially defined to be completely outside each other. There are two negative real eigenvalues that produced admissible eigenvectors. Because the vectors do not satisfy equations $X \cdot A \cdot X^T = 0$ and $X \cdot B \cdot X^T = 0$, no point is shared in common between the ellipsoids.

The primary ellipsoid was continually scaled up until a point just touched the secondary ellipsoid. When just touching, only a single unique point satisfied the $X \cdot A \cdot X^T = 0$ and $X \cdot B \cdot X^T = 0$ equations. The two eigenvalues moved towards each other until they meet. At this point the admissible eigenvectors gave the solution to where the ellipsoids touch. The scaling then continued so that both ellipsoids shared some volume in common. The two admissible eigenvalues became complex conjugates. The real portion of the eigenvectors satisfied the inequality for both ellipsoids as defined in the $X \cdot A \cdot X^T \leq 0$ and $X \cdot B \cdot X^T \leq 0$ equations. The location indicated by the real portion of the eigenvectors is located inside both ellipsoids and therefore the ellipsoids are intersecting each other. As the primary ellipsoid continued to grow, the primary ellipsoid eventually touched the far side of the secondary ellipsoid. The two admissible eigenvalues again became real and repeated, but were positive instead of negative. Again, those eigenvectors defined the exact point where the ellipsoids touched. Scaling beyond this point always provides two positive real admissible eigenvalues that moved away from each other. The moving of the two positive real admissible eigenvalues away from each other indicates that some portion of the primary surface had entered and exited the secondary ellipsoid. The moving of the two positive real admissible eigenvalues away from each other does not indicate that the primary ellipsoid had completely engulfed the secondary, for example, when a long thin secondary ellipsoid is moving completely through a larger spherical primary ellipsoid.

The mathematical formulation enables uses of eigenvalue behavior to describe the state of spatial coincidence. The mathematical formation represents eigenvalue behavior in two and three dimensions, but for simplicity can be shown for a single dimension, which can then be generally applied to an n-dimensional proof. All objects can be scaled and rotated so that the primary ellipsoid is centered at the origin with unit dimensions. The primary ellipsoid is a sphere and the primary ellipse is a circle. By selecting the proper viewing geometry, two ellipsoids that do not touch can be projected to two ellipses that do not touch. These ellipses can then be projected as to two lines that do not touch. This process reduces the mathematical problem to a single dimension.

Figure 2:
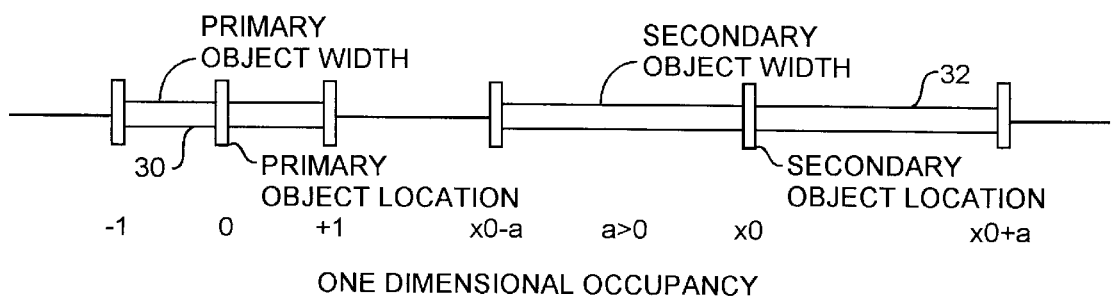
FIG. 2 is a line graph showing a one dimensional occupancy.

Referring to FIGS. 1 and 2, and more particularly to FIG. 2 showing one dimensional occupancy for a single dimension analysis, the primary object may be viewed as a line ranging from $-1$ to $+1$ having a surface represented by the end points. The secondary ellipsoid may also be viewed as a line ranging from (x0−a) to (x0+a). Scaling can be accomplished so that the only case needing consideration is when x0>0 and a>0. Algebraically these endpoints can be expressed as $x^2=1$ and $a^{-2} \cdot (x-x0)^2=1$. In matrix form these $x^2=1$ and $a^{-2} \cdot (x-x0)^2=1$ linear equations become (x 1) matrix equations:

$$(x\ 1) \cdot \begin{pmatrix} 1 & 0 \\ 0 & -1 \end{pmatrix} \cdot \begin{pmatrix} X \\ 1 \end{pmatrix} = 0$$

$$(x\ 1) \cdot \begin{pmatrix} 1 & 0 \\ -x0 & -1 \end{pmatrix} \cdot \begin{pmatrix} a^{-2} & 0 \\ 0 & -1 \end{pmatrix} \cdot \begin{pmatrix} 1 & -x0 \\ 0 & 1 \end{pmatrix} \cdot \begin{pmatrix} X \\ 1 \end{pmatrix} = 0$$

The eigenvalues of $(\lambda A - B)$ are solved for providing an A and B matrix equation and a $\lambda$ scalar equation.

$$A = \begin{pmatrix} 1 & 0 \\ 0 & -1 \end{pmatrix}$$

$$B = \begin{pmatrix} \dfrac{1}{a^2} & \dfrac{-x0}{a^2} \\ \dfrac{-x0}{a^2} & \dfrac{x0^2}{a^2} - 1 \end{pmatrix}$$

$$\lambda = \dfrac{-x0^2 + a^2 + 1 \pm \sqrt{(a+1-x0) \cdot (a+1+x0) \cdot (a-1-x0) \cdot (a-1+x0)}}{2 \cdot a^2}$$

The $\lambda$ equation enables computation of two eigenvalues in the line example of FIG. 2 that aids visualization of all possible values, both real and complex, of the solution for the one dimensional analysis where a>0 and x0>0. FIG. 2 shows that for the constraint [(x0−a)>1], the one dimensional lines do not touch. Placing the [(x0−a)>1] constraint, that the lines do not touch, into the $\lambda$ equation will always produce negative real distinct eigenvalues. The distinct, that is different, eigenvalues further indicate the extent of intersection, such as no intersection. Increasing the value [a] and/or decreasing the value [x0] such that [(x0−a)=1] allows the lines to just touch on the positive near side. The eigenvalues repeat with a value of [−1/a]. Continuing to increase [a] or decrease [x0] such that [−1<(x0−a)<1] and [(x0+a)>1] causes the lines to overlap, but not completely. The eigenvalues will always be complex conjugates under these conditions. Should [(x0−a)=−1] and [(x0+a)>1] then the lines overlap and just touch on the negative far side. The eigenvalues repeat with a value of [+1/a]. In the event that [−1<(x0−a)<1] while [(x0+a)<=1] then the secondary line is completely inside the primary and the eigenvalues are positive, real, and distinct. For the final case [(x0−a)<−1] the primary line is completely inside the secondary and the eigenvalues are again positive real distinct eigenvalues.

The representative locus of admissible eigenvalues shown in FIG. 1 provides the admissible eigenvalues of $A^{-1} \cdot B$. When two eigenvalues are negative real and different, then the two ellipsoids share no volume in common. When the two eigenvalues are negative real and identical, then the two ellipsoids share a single point in space where the primary ellipsoid just touches the secondary ellipsoid at the side nearest the origin. When the two eigenvalues are complex conjugates, the surfaces of the ellipsoids are intersected. When the two eigenvalues are positive real and identical, then the ellipsoids share volume and also a single point in space where the primary ellipsoid just touches the secondary ellipsoid on the side farthest from the origin. When all of the eigenvalues are positive real, then one ellipsoid completely penetrates the other without necessarily engulfing the other ellipsoid.

An exemplar ellipsoidal evaluation involves a primary ellipsoid that is 4 units long on the x axis and 2 units long on the y and z axes. The secondary ellipsoid is 6 units long on the x axis, 4 on the y and 8 on the z axes having a center at [7 0 0]. The primary ellipsoid should just touch the secondary ellipsoid on the near side when scaled by 2 and just touch the far side when scaled by 5. The touching will occur on the x axis. The initial A and B matrices are set by an A and two B initial condition matrix equations:

$$A = \begin{pmatrix} 0.25 & 0 & 0 & 0 \\ 0 & 1 & 0 & 0 \\ 0 & 0 & 1 & 0 \\ 0 & 0 & 0 & -1 \end{pmatrix}$$

$$B = \begin{pmatrix} 1 & 0 & 0 & 0 \\ 0 & 1 & 0 & 0 \\ 0 & 0 & 1 & 0 \\ -7 & 0 & 0 & 1 \end{pmatrix} \cdot \begin{pmatrix} 0.111 & 0 & 0 & 0 \\ 0 & 0.25 & 0 & 0 \\ 0 & 0 & 0.063 & 0 \\ 0 & 0 & 0 & -1 \end{pmatrix} \cdot \begin{pmatrix} 1 & 0 & 0 & -7 \\ 0 & 1 & 0 & 0 \\ 0 & 0 & 1 & 0 \\ 0 & 0 & 0 & 1 \end{pmatrix}$$

$$B = \begin{pmatrix} 0.111 & 0 & 0 & -0.778 \\ 0 & 0.25 & 0 & 0 \\ 0 & 0 & 0.063 & 0 \\ -0.778 & 0 & 0 & 4.444 \end{pmatrix}$$

Scaling the primary ellipsoid by a factor of n is done by simply multiplying the last element of A by $n^2$. When 4×4 extradimensional covariance matrices are assembled at steps 52 and 54, the four eigenvalues are computed, and four respective eigenvectors could be computed for verification. In the comparing step 58, the four eigenvalues are examined, and two are selected when two are found that are identical indicating just touching, or complex conjugates indicating multiple point intersection. Hence, the eigenvalues alone can provide a history of the extent of penetration of one ellipsoid into another.

A history of the eigenvalues and respective interpretations can indicate the movement of two intersecting ellipsoids. This history can be viewed by exemplar eigenvalues. When initially outside each other, the first eigenvalue is −0.114 and the second eigenvalue is −3.886 and hence, are negative and real but not identical, and hence the eigenvalues indicate that the ellipsoids do not touch, and the eigenvector is meaningless. When the ellipsoid firstly touch each other on the near side, the first eigenvalue is −0.333 and the second eigenvalue is also −0.333. The eigenvalues are negative real identical eigenvalues indicating just touching on the near side. The eigenvector is [4 0 0 1] with a nonzero last component indicating an admissible eigenvector and admissible eigenvalues. When the ellipsoids firstly overlap each other, the first eigenvalue is complex and equal to −0.025+0.221i and the second eigenvalue is also complex and equal to −0.025−0.221i, as complex conjugates, and the eigenvector is [5.429−2.556i 0 0 1], and is admissible. When the ellipsoids lastly overlap each other, the first eigenvalue is complex and equal to 0.083+0.114i and the second eigenvalue is also complex and equal to 0.083−0.114i, as complex conjugates, and the eigenvector is [7.429−2.969i 0 0 1], and is admissible. When the ellipsoids lastly touch each other on the far side, the first eigenvalue is 0.133 and the second eigenvalue is also 0.133, as real positive negative and the eigenvector is [10 0 0 1], and is admissible.

The method is preferably applied to spacecraft avoidance methods where thrusters can be used to maneuver a spacecraft for avoiding collision with another object. The method can also be applied to overlapping ellipse circumstances to prevent accidental laser illumination of an area when a secondary object blocks the line of sight of a primary laser source. Additionally, the method can be used to determine the possibility of radio frequency interference on a primary receiving object by modeling the antenna lobe as an ellipsoid with a blocking interfering secondary object penetrating the antenna lobe. In robotics, mechanical machines manipulate real objects. The method can be used to determined when objects will intersect, which may be useful in automated manufacturing lines. In computer graphics, lines, plans, curved surfaces, and object volumes are virtual objects subject to display on a monitor. For computer graphics users, such analysis could indicate, for example, when to invoke a hidden line removal algorithm, or to indicate when virtual objects share the same points.

Coordinate reduction may occur through projection. Although two ellipsoids in three dimensions may not share the same space, when viewed from certain angles, one ellipsoid may appear to cover or overlap the other, with the ellipsoids appearing as overlapping ellipses. In the case of using ellipses for blocking line of sights, the coordinate frame can be rotated so that the blocking object is viewed and illuminated through the line of sight. However, the coordinate frame needs to be rotated in four dimensional space to accommodate the extradimensional processing of the covariance matrices. The coordinate rotations are accomplished through the matrix representation of $X \cdot R \cdot S \cdot R^T \cdot X^T = 0$, where rotation about the x axis of angle $\alpha$ produces an Rx matrix equation, rotation about the y axis of angle $\beta$ yields an Ry matrix equation, and rotation about the z axis of angle $\theta$ provides an Rz matrix equation:

$$Rx = \begin{pmatrix} 1 & 0 & 0 & 0 \\ 0 & \cos(\alpha) & \sin(\alpha) & 0 \\ 0 & -\sin(\alpha) & \cos(\alpha) & 0 \\ 0 & 0 & 0 & 1 \end{pmatrix}$$

$$Ry = \begin{pmatrix} \cos(\beta) & 0 & -\sin(\beta) & 0 \\ 0 & 1 & 0 & 0 \\ \sin(\beta) & 0 & \cos(\beta) & 0 \\ 0 & 0 & 0 & 1 \end{pmatrix}$$

$$Rz = \begin{pmatrix} \cos(\theta) & \sin(\theta) & 0 & 0 \\ -\sin(\theta) & \cos(\theta) & 0 & 0 \\ 0 & 0 & 1 & 0 \\ 0 & 0 & 0 & 1 \end{pmatrix}$$

The individual Rx, Ry, and Rz rotational matrices can be multiplied to produce an overall rotation matrix R. The signs of the sine terms are necessary for the positive right-hand rule convention. Also, the order of multiplication assures the desired overall coordinate rotation. Coordinate reduction is done by means of an orthographic projection in the rotated space to eliminate one component. The choice of coordinate for reduction is a design preference. In an exemplar form and for a projection along the z axis, the dimension of the z component is eliminated, resulting in a P matrix equation where $X \cdot (P \cdot R \cdot S \cdot R^T \cdot P^T) \cdot X = 0$.

$$P = \begin{pmatrix} 1 & 0 & 0 & 0 \\ 0 & 1 & 0 & 0 \\ 0 & 0 & 0 & 0 \\ 0 & 0 & 0 & 1 \end{pmatrix}$$

When the projection is completed, the expression in parenthetical term $(P \cdot R \cdot S \cdot R^T \cdot P^T)$ becomes singular. To proceed, it is necessary to reduce the dimension of the state vector and associated formulation. It is also still necessary to translate the resultant based on the new coordinate frame. To do so, a new translation vector $[X1\ Y1\ Z1\ 1] = [X0\ Y0\ Z0\ 1] \cdot R$ is computed and inserted into the new translation matrix Tnew.

$$Tnew = \begin{pmatrix} 1 & 0 & 0 & 0 \\ 0 & 1 & 0 & 0 \\ 0 & 0 & 1 & 0 \\ -X1 & -Y1 & -Z1 & 1 \end{pmatrix}$$

Combining all terms in the correct order produces a new projection equation $X \cdot Tnew \cdot P \cdot R \cdot S \cdot R^T \cdot P^T \cdot Tnew^T \cdot X^T$.

Elliptical formulation and solution determining when two ellipses share the same area is identical to the ellipsoidal formulation reduced by one dimension. In matrix form, the new z component resulting from coordinate rotation is eliminated and the equations are reduced by one dimension such that $X = [x\ y\ 1]$. An ellipsoid described by the rotated 4×4 A matrix is projected into the new x-y plane by removing the third row and column to produce the 3×3 AP matrix. The relationship $X \cdot AP \cdot X = 0$ now describes the primary's projected ellipse in the new, dimensionally reduced frame. The same projection and reduction is done for the secondary object to determine the BP matrix $X \cdot BP \cdot X = 0$. When any X exists such that X satisfies the $X \cdot AP \cdot X = 0$ and the $X \cdot BP \cdot X = 0$ equations, then the primary and secondary projections intersect at that point. When some value of X satisfies the constraint for both projections as represented by the $X \cdot AP \cdot X^T \leq 0$ and $X \cdot BP \cdot X^T \leq 0$ equations, then that point lies inside both ellipses.

The evaluation is identical to the ellipsoidal one, observing the admissible eigenvalue behavior of $AP^{-1} \cdot BP$ to determine when the ellipses shared the same space. When two eigenvalues are negative real and different, then the ellipses share no area in common. When two eigenvalues are negative real and identical, then the ellipses just touch on the side nearest the origin of the secondary ellipse. When the two eigenvalues are complex conjugates, the ellipses intersect at two points. When the two eigenvalues are positive real and identical, then the ellipses share area and just touch on the far side. When all of the eigenvalues are positive real, then one ellipse penetrates or engulfs the other ellipse.

Figure 3:
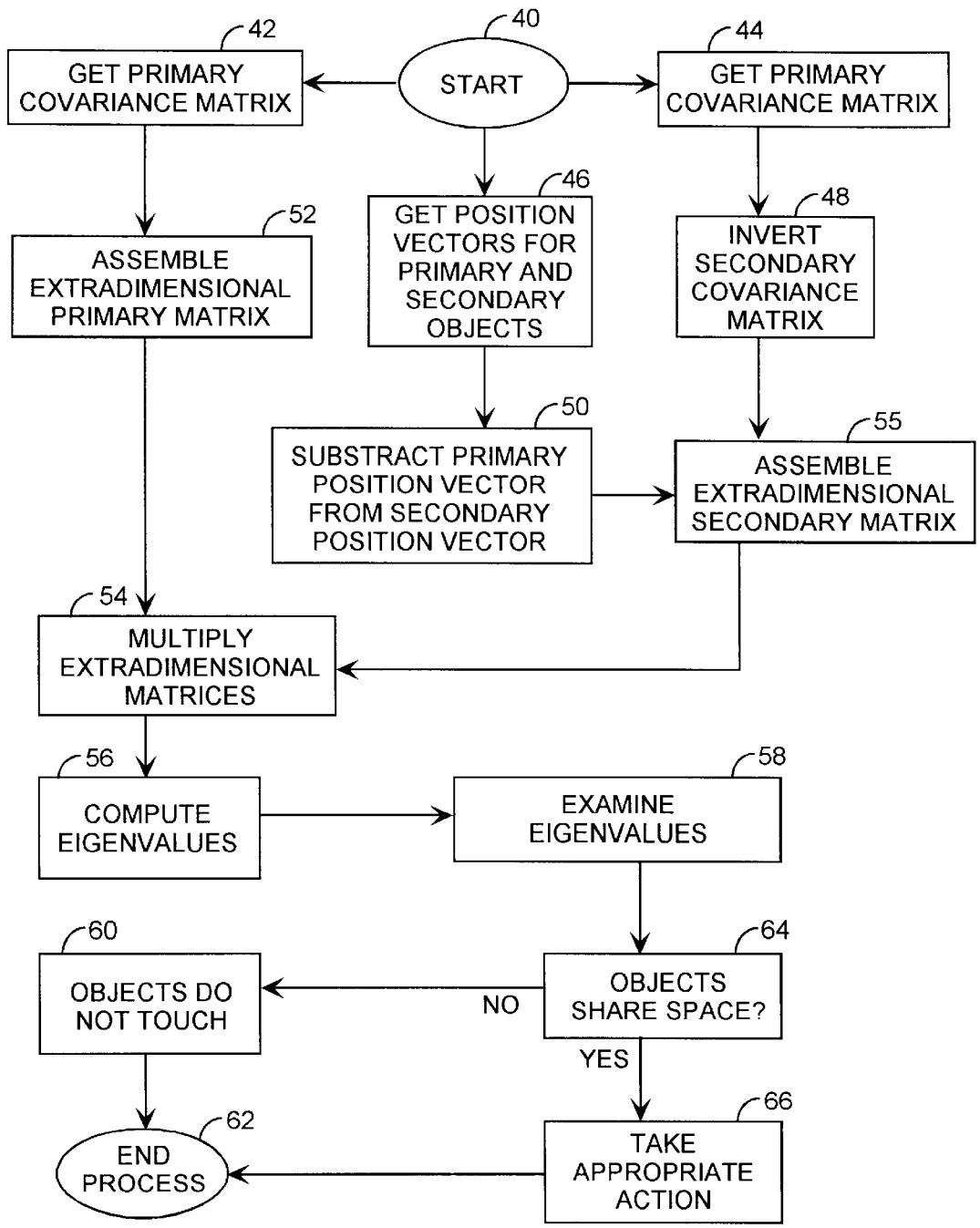
FIG. 3 is a process flow diagram of a collision detection process.

Referring to FIG. 3, a preferred collision detection and avoidance process is shown. The detection and avoidance process starts 40 and receives as inputs a primary object covariance matrix 42 and a secondary object covariance matrix 44. The process also receives primary object and secondary object position vectors 46. The primary object and secondary object position vectors are subtracted 50 providing a difference position vector. The primary object covariance matrix is extended 52 by an extra dimension 52 into an extended extradimensional covariance matrix. Concurrently, the primary object covariance matrix is inverted 48 for providing an inverted secondary object covariance matrix that represents the secondary ellipsoid in quadric form. The primary ellipsoid covariance matrix is firstly inverted, then extended into the extradimensional covariance matrix, and then inverted again. The result is the same as simply extending the primary ellipsoid covariance matrix into the extra dimension without inverting the primary ellipsoid covariance matrix. Hence, the primary ellipsoid covariance matrix is not inverted twice so as to save computation processing.

The subtracting of the primary and secondary position vector creates a relative position vector effectively placing the primary object at the center of an intermediate coordinate frame with the position of the secondary object relative to the position of the primary object. The secondary covariance matrix is inverted to place the secondary covariance matrix in quadric form. The relative position vector and the inverted secondary covariance matrix are assembled 55 into an extradimensional secondary covariance matrix. The secondary object covariance matrix is inverted once 48 and extended 55 into the extra dimension 52. Hence, the primary covariance matrix is inverted twice, effectively becoming noninverted, while the secondary covariance matrix is only inverted once 48. The primary and secondary extradimensional covariance matrices are multiplied together 54 for providing a product covariance matrix. Eigenvalues are computed 56 from the product covariance matrix and examined and compared 58 for determining, for example, when there are two negative real distinct eigenvalues. When there are no two negative real distinct eigenvalues, then the primary and secondary object do touch 64 and the process stops 62. In the case of a spacecraft collision detection and avoidance application, the computed eigenvalues can indicate a potential collision, and appropriate action 66, such as maneuvering the spacecraft to avoid the collision, and the process is then stopped 62.

The analytical method can determine when two ellipsoids share the same volume using computed eigenvalues from a product covariance matrix. This method can be used to alert operators of existing or impending conjunctions and collisions. The method adds an extra dimension to the solution space and then examines the admissible eigenvalues. The admissible eigenvalues are examined to determine when any volume is shared. When volume is shared, a subset of the eigenvalues defines degenerate quadric surfaces that pass through the points of intersection. The same method is used to determine when two ellipsoids appear to share the same projected area based on viewing angle. This approach yields direct results without approximation, iteration, or any form of search. Those skilled in the art can make enhancements, improvements, and modifications to the invention, and these enhancements, improvements, and modifications may nonetheless fall within the spirit and scope of the following claims.

What is claimed is:

1. A method for determining spatial coincidence between a primary object and a secondary object, the method comprising the steps of, receiving a primary object covariance matrix, receiving a secondary object covariance matrix, receiving a primary object position vector, receiving a secondary object position vector, extending by one dimension the primary object covariance matrix into an extended primary object covariance matrix, inverting the secondary object covariance matrix into an inverted secondary object covariance matrix, subtracting the primary object position vector from the secondary position vector for providing a relative position vector, extending the secondary object inverted covariance matrix by the difference position vector into an extended object B covariance matrix, multiplying the extended secondary object covariance matrix by the extended primary object covariance matrix for providing a product covariance matrix, computing eigenvalues of the product covariance matrix, examining the eigenvalues for determining the spatial coincidence of primary object and the secondary object, and acting upon the determination of the determining step.

2. The method of claim 1 wherein primary object and secondary object are spaceborne objects, and wherein the acting step is a maneuvering step for maneuvering the primary object to avoid collision with the secondary object.

3. The method of claim 1 wherein primary object and secondary object are airborne objects, and wherein the acting step is a maneuvering step for maneuvering the secondary object to avoid collision of primary object with the secondary object.

4. The method of claim 1 wherein the primary and secondary objects are selected from the group consisting of points, lines, areas, surfaces, or volumes.

5. The method of claim 1 wherein the covariance matrices are 3×3 and the extradimensional matrices are 4×4.

6. The method of claim 1 wherein, the objects are virtual objects stored in a computer system.

7. The method of claim 1 wherein the primary object is a primary ellipsoid, the secondary object is a secondary ellipsoid, and the examining step determines:

when two eigenvalues are negative real different eigenvalues, then the primary and secondary ellipsoids shared no volume in common;

when the two eigenvalues are negative real identical eigenvalues, then the primary and secondary ellipsoids shared a single point in space where the primary ellipsoid just touches the secondary ellipsoid at a side of the secondary ellipsoid nearest an origin of the primary ellipsoid;

when the two eigenvalues are complex conjugates, the surfaces of the primary and secondary ellipsoids are intersected by more than one point; and when the two eigenvalues are positive real identical eigenvalues, then the primary and secondary ellipsoids shared volume is a single point in space where the primary ellipsoid just touches the secondary ellipsoid on a side of the secondary ellipsoid farthest from the origin of the primary ellipsoid.

8. The method of claim 1 wherein, the primary object is a primary virtual ellipsoid, the secondary object is a secondary virtual ellipsoid, and in the examining step:

when two eigenvalues are negative real different eigenvalues, then the two virtual ellipsoids shared no volume in common;

when the two eigenvalues are negative real identical eigenvalues, then the virtual ellipsoids shared a single point in space where the primary virtual ellipsoid just touches the secondary virtual ellipsoid at a side of the secondary virtual ellipsoid nearest an origin of the primary virtual ellipsoid;

when the two eigenvalues are complex conjugates, the surfaces of the virtual ellipsoids are intersected by more than one point; and when the two eigenvalues are positive real identical eigenvalues, then the virtual ellipsoids shared volume is a single point in space where the primary virtual ellipsoid just touches the secondary virtual ellipsoid on a side of the secondary virtual ellipsoid farthest from the origin of the primary virtual ellipsoid.

9. The method of claim 8 wherein the examining step further determines:

when all of the computed eigenvalues are positive real different eigenvalues, then the primary virtual ellipsoid is penetrated on two sides of the primary virtual ellipsoid by the secondary virtual ellipsoid, or then the primary virtual ellipsoid has engulfed the secondary virtual ellipsoid.

10. The method of claim 1 wherein one of the objects is in space with thrusters, and in the taking action step, the thrusters manipulate the one object to avoid collision of the objects.

11. The method of claim 1 wherein one of the objects is manipulated by robotics, and in the taking action step, the robotics manipulate the one of the primary or secondary objects to avoid collision of the primary and secondary objects.

12. The method of claim 1 wherein the spatial coincidence is virtual spatial coincidence realized in a computing device displaying the virtual spatial coincidence.

13. The method of claim 1 wherein the primary and secondary objects are virtual primary and secondary objects, the spatial coincidence is virtual spatial coincidence, the virtual primary and secondary objects represented in a computing device for displaying virtual objects, and the primary and secondary position vectors both indicate zero velocity of the virtual primary and secondary objects.

14. The method of claim 1 wherein, the primary and secondary objects are three dimensional, the primary and secondary covariance matrices and position vectors are three dimensional, the assemble steps further comprise the steps of, rotating the extradimensional primary and secondary covariance matrices as rotated extradimensional primary and secondary covariance matrices for viewing the primary and secondary objects through a line of sight, and reducing the rotated extradimensional primary and secondary covariance matrices by one dimension into reduced rotated extradimensional primary and secondary covariance matrices, the multiplying steps multiplies the reduced rotated extradimensional primary and secondary covariance matrices.

15. The method of claim 14 wherein, the primary and secondary objects are three dimensional, the primary and secondary covariance matrices are three dimensional, the extradimensional primary and secondary covariance matrices are four dimensional, and the reduced rotated extradimensional primary and secondary covariance matrices are three dimensional.

16. A method for determining spatial coincidence between a primary object and a secondary object, the method comprising the steps of, receiving a primary object 3×3 covariance matrix, receiving a secondary object 3×3 covariance matrix, receiving a primary 3×3 position vector, receiving an object 3×3 position vector, extending the primary object covariance matrix into an extended primary object 4×4 covariance matrix with a one in the 4–4 position, zero is inserted in the fourth row and column with a minus one in the fourth-fourth position, inverting the secondary object 3×3 covariance matrix into an inverted secondary object 3×3 covariance matrix, subtracting the primary object 3×3 position vector from the secondary 3×1 position vector for providing a 3×1 relative position vector, extending the inverted secondary object 3×3 covariance matrix by the relative 3×3 position vector into an extended secondary object 4×4 covariance matrix where zero is inserted in the fourth row and column with a minus one in the fourth-fourth position, multiplying the extended secondary object 4×4 covariance matrix the inverted covariance matrix by the extended primary object 4×4 covariance matrix for providing a product 4×4 covariance matrix, computing four eigenvalues of the product 4×4 covariance matrix, examining the four eigenvalues for determining when the four eigenvalues indicate spatial coincidence of the primary object with the secondary object, and acting upon the determination of the determining step.

\* \* \* \* \*